(12) United States Patent
Lee et al.

(10) Patent No.: US 12,154,255 B2
(45) Date of Patent: Nov. 26, 2024

(54) IMAGE PROCESSING APPARATUS AND IMAGE PROCESSING METHOD THEREOF

(71) Applicant: PIXELPLUS CO., LTD., Suwon-si (KR)

(72) Inventors: Myung Ho Lee, Seoul (KR); Hyun Sik Jang, Yongin-si (KR)

(73) Assignee: PIXELPLUS CO., LTD., Suwon-si (KR)

( * ) Notice: Subject to any disclaimer, the term of this patent is extended or adjusted under 35 U.S.C. 154(b) by 197 days.

(21) Appl. No.: 18/066,828

(22) Filed: Dec. 15, 2022

(65) Prior Publication Data

US 2023/0196518 A1 Jun. 22, 2023

(30) Foreign Application Priority Data

Dec. 22, 2021 (KR) ........................ 10-2021-0185187
Oct. 4, 2022 (KR) ........................ 10-2022-0126603

(51) Int. Cl.
*G06T 5/70* (2024.01)
*G06T 3/40* (2006.01)
*G06T 5/20* (2006.01)
*G06T 7/11* (2017.01)
*G06T 9/00* (2006.01)

(52) U.S. Cl.
CPC ............... *G06T 5/70* (2024.01); *G06T 3/40* (2013.01); *G06T 5/20* (2013.01); *G06T 7/11* (2017.01); *G06T 9/00* (2013.01); *G06T 2207/20064* (2013.01); *G06T 2207/20182* (2013.01)

(58) Field of Classification Search
CPC .................. G06T 5/70; G06T 2207/20064
See application file for complete search history.

(56) References Cited

U.S. PATENT DOCUMENTS

2020/0357098 A1* 11/2020 Yoo .................. G16H 50/20

FOREIGN PATENT DOCUMENTS

| JP | 2011-055415 A | 3/2011 |
| JP | 2018-050263 A | 3/2018 |
| KR | 10-2010-0035909 A | 4/2010 |
| KR | 10-1926269 B1 | 12/2018 |

OTHER PUBLICATIONS

Ajay Boyat et al., "Image Denoising using Wavelet Transform and Median Filtering," 2013 Nirma University International Conference on Engineering, 2013.

* cited by examiner

*Primary Examiner* — Michael H Hong

(57) ABSTRACT

An image processing apparatus includes a discrete wavelet transform (DWT) device that performs DWT and down sampling for a first source image to divide the first source into a low-frequency sub-image including a low-frequency component in a horizontal direction and a vertical direction and a plurality of high-frequency sub-images including a high-frequency component in at least one of the horizontal direction or the vertical direction, a frame memory storing a low-frequency sub-image of a second source image, a first noise reduction device that reduces noise in the low-frequency sub-image of the first source image using the low-frequency sub-image of the second source image, and an inverse discrete wavelet transform (IDWT) device that applies IDWT to the low-frequency sub-image of the first sub-image, which is reduced in noise through the first noise reduction device, and the high-frequency sub-images of the first image to restore the first source image.

15 Claims, 7 Drawing Sheets

IMAGE PROCESSING APPARATUS AND IMAGE PROCESSING METHOD THEREOF

CROSS-REFERENCE TO RELATED APPLICATION

This application claims the benefit of priority to Korean Patent Application No. 10-2021-0185187, filed in the Korean Intellectual Property Office on Dec. 22, 2021 and Korean Patent Application No. 10-2022-0126603, filed in the Korean Intellectual Property Office on Oct. 4, 2022, the entire contents of which are incorporated herein by reference.

TECHNICAL FIELD

The present disclosure relates to an image processing apparatus for performing three-dimensional (3D) noise reduction (3DNR) for a source image using a frame memory of a small size (capacity).

BACKGROUND

An image sensor may amplify its output to amplify a video signal upon low illuminance. Gain noise may occur on the screen when the output of the image sensor is amplified. Such noise may be removed by means of a 3DNR method to obtain a clearer image.

However, because a previous frame (screen) should be stored to remove noise using the 3DNR method, a frame memory with large capacity is required. This may be a factor which lowers the competitiveness of the product.

SUMMARY

The present disclosure has been made to solve the above-mentioned problems occurring in the prior art while advantages achieved by the prior art are maintained intact.

An aspect of the present disclosure provides an image processing apparatus for reducing noise in a source image using a 3DNR method even using a frame memory of a small size and an image processing method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an image processing apparatus may include a discrete wavelet transform (DWT) device that performs DWT and down sampling for a first source image to divide the first source into a low-frequency sub-image including a low-frequency component in a horizontal direction and a vertical direction and a plurality of high-frequency sub-images, each of which includes a high-frequency component in at least one of the horizontal direction or the vertical direction, a frame memory storing a low-frequency sub-image of a second source image which is input before the first source image is input and is reduced in noise, a first noise reduction device that reduces noise in the low-frequency sub-image of the first source image using the low-frequency sub-image of the second source image stored in the frame memory, and an inverse discrete wavelet transform (IDWT) device that applies IDWT to the low-frequency sub-image of the first sub-image, the low-frequency sub-image being reduced in noise through the first noise reduction device, and the high-frequency sub-images of the first sub-image, the high-frequency sub-images not passing through the first noise reduction device, to restore the first source image.

According to another aspect of the present disclosure, an image processing method may include performing DWT and down sampling for a first source image to divide the first source into a low-frequency sub-image including a low-frequency component in a horizontal direction and a vertical direction and a plurality of high-frequency sub-images including a high-frequency component in at least one of the horizontal direction or the vertical direction, reducing noise in the low-frequency sub-image of the first source image using a low-frequency sub-image of a second source image stored in a memory, and performing IDWT of the low-frequency sub-image of the first sub-image, the low-frequency sub-image being reduced in noise through the performing of the DWT and the down sampling and the reducing of the noise, and high-frequency sub-images of the first image, high-frequency sub-images not passing through the performing of the DWT and the down sampling and the reducing of the noise to restore the first source image.

The technical problems to be solved by the present disclosure are not limited to the aforementioned problems, and any other technical problems not mentioned herein will be clearly understood from the following description by those skilled in the art to which the present disclosure pertains.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
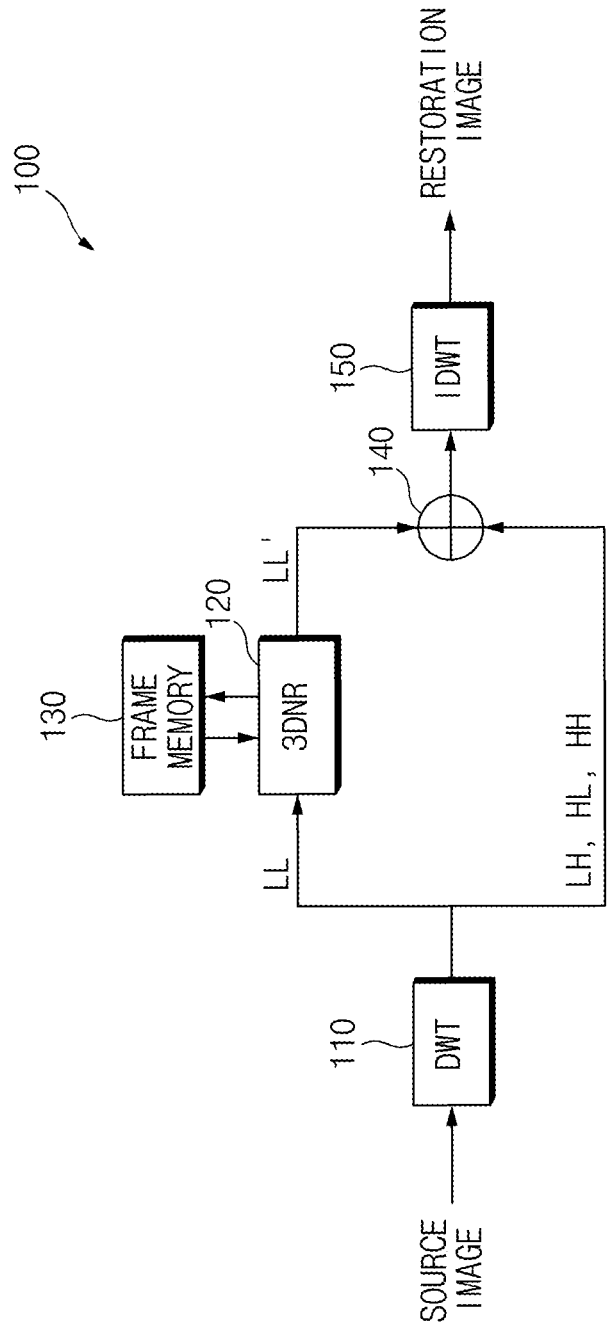
FIG. 1 is a block diagram schematically illustrating a configuration of an image processing apparatus according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Figure 2:
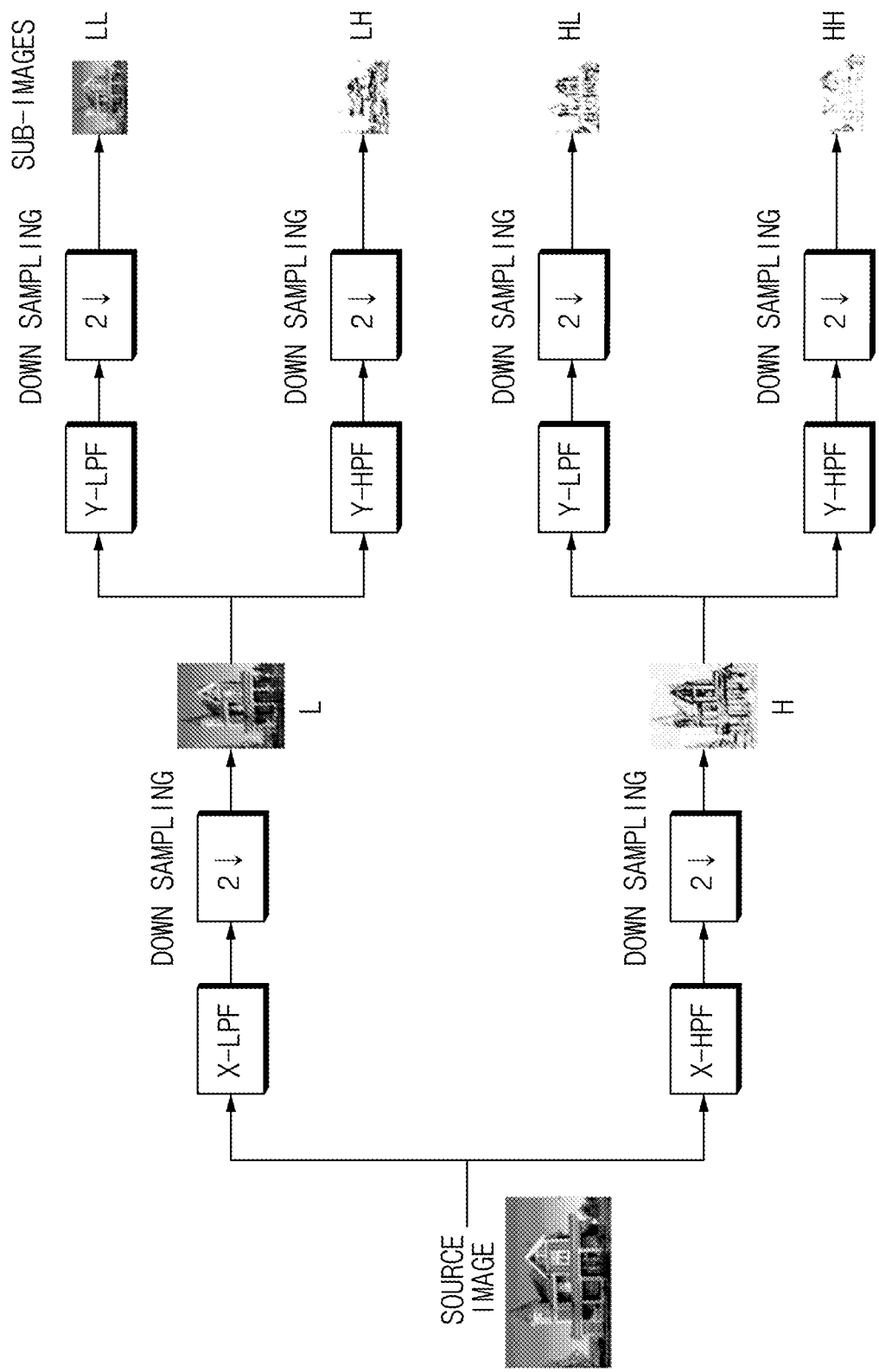
FIG. 2 is a drawing for describing a process of dividing a source image into sub-images in a discrete wavelet transform (DWT) device of FIG. 1.

FIG. 1 is a block diagram schematically illustrating a configuration of an image processing apparatus according to an embodiment of the present disclosure. FIG. 2 is a drawing for describing a process of dividing a source image into sub-images in a discrete wavelet transform (DWT) device of FIG. 1. Furthermore, FIG. 3 is a drawing illustrating sub-images LH1, HL1, HH1, LL2, LH2, HL2, and HH2 in a hierarchical structure, which are generated by means of a two-step division process of DWT.

Figure 3:
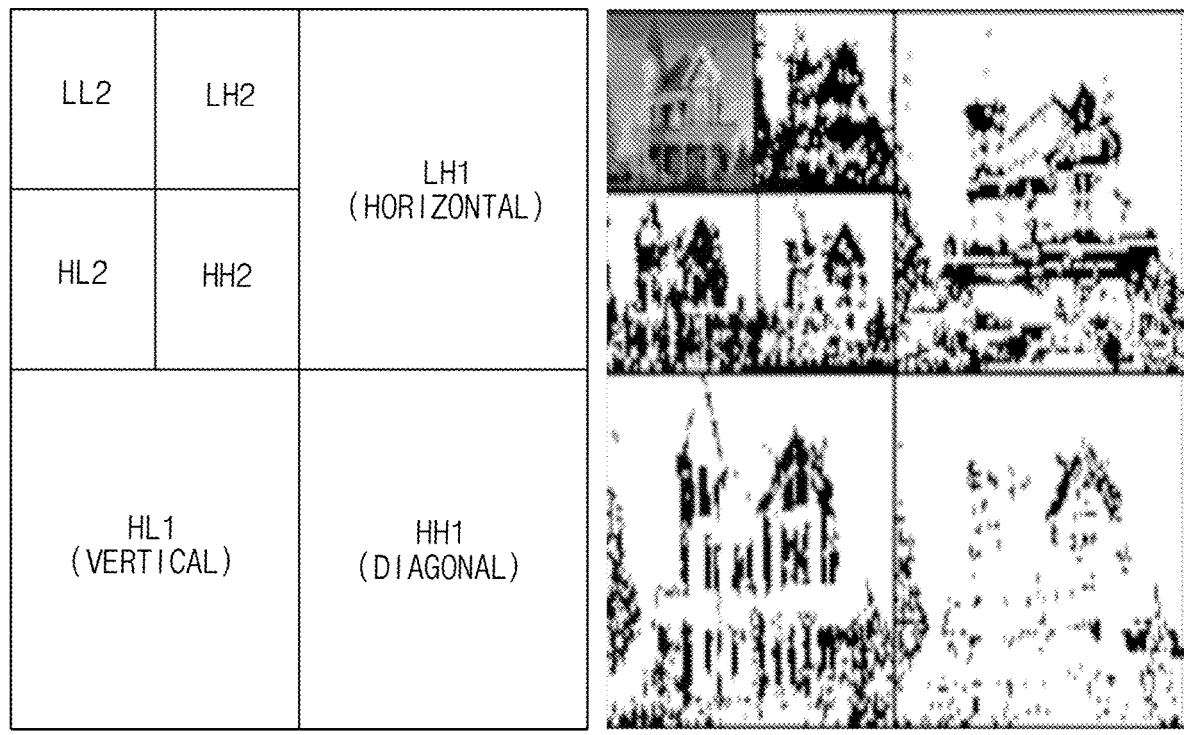
FIG. 3 is a drawing illustrating sub-images in a hierarchical structure, which are generated by means of a two-step division process of DWT.

Referring to FIGS. 1 to 3, an image processing apparatus 100 may include a DWT device 110, a three-dimensional noise reduction (3DNR) device 120, a frame memory 130, an image adder 140, and an inverse discrete wavelet transform (IDWT) device 150.

The DWT device 110 may perform DWT for a source image to divide the source image into a plurality of sub-images LL, LH, HL, and HH. For example, as shown in FIG. 2, the DWT device 110 may apply a low pass filter X-LPF and a high pass filter X-HPF to the source image in a horizontal direction (e.g., an X direction) to divide one source image (e.g., one source frame) into a sub-image L having a low-frequency component in the horizontal direction and a sub-image H having a high-frequency component in the horizontal direction and may apply a low pass filter Y-LPF and a high pass filter Y-HPF to each of the two sub-images L and H in a vertical direction (e.g., a Y direction) to divide the one source image into four sub-images LL, LH, HL, and HH. At this time, LL may be a sub-image including a low-frequency component in the horizontal direction and the vertical direction, which may have important information with high concentration of energy and about the source image. LH, HL, and HH may be sub-images, each of which has the high-frequency component, which have edge components in horizontal, vertical, and diagonal directions of the source image, respectively, which may have details with low concentration of energy and corresponding to a contour portion of the source image.

Herein, the DWT device 110 may perform first down sampling (2↓), which takes only half of input data, with respect to the signal of the low-frequency component and the signal of the high-frequency component, which are obtained by filtering the source image in the horizontal direction, to obtain the two sub-images L and H. Furthermore, the DWT device 110 may perform second down sampling (2↓), which takes only half of the input data, with respect to the signal of the low-frequency component and the signal of the high-frequency component, which are obtained by filtering each of the two sub-images L and H, the first down sampling of which is pertained in the horizontal direction, to obtain the four sub-images LL, LH, HL, and HH. As a result, the DWT device 110 may divide the source image into the four sub-images LL, LH, HL, and HH. The sub-images LL, LH, HL, and HH may be images, a size (e.g., a capacity) of which decreases to ¼ compared to the source image.

When the DWT device 110 repeatedly performs DWT and down sampling N times, sub-images, sizes (e.g., capacities) of which decrease by $(¼)^N$ times compared to the source image.

The DWT device 110 may transmit only a signal for the sub-image LL having the low-frequency component in the horizontal direction and the vertical direction among the divided sub-images LL, LH, HL, and HH to the 3DNR device 120 and may transmit a signal for the other sub-images LH, HL, and HH to the image adder 140. As shown in FIG. 3, the DWT device 110 may additionally perform DWT and down sampling for only the sub-image LL with high concentration of energy to obtain two-step sub-images LL2, LH2, HL2, and HH2 with a smaller size (e.g., a $(¼)^2$ times size). In such a case, the DWT device 110 may transmit only the two-step sub-image LL2 to the 3DNR device 120.

In FIG. 3, sub-images LH1, HL1, and HH1 indicate one-step sub-images obtained by proceeding with DWT and down sampling in the horizontal and vertical directions for the source image once. The sub-images LL2, LH2, HL2, and HH2 indicate two-step sub-images obtained by proceeding with DWT and down sampling in the horizontal and vertical directions for one-step sub-image LL1 one more time.

The 3DNR device 120 may perform noise cancellation for the sub-image LL provided from the DWT device 110. The 3DNR device 120 may perform a 3DNR method for reducing noise in a spatial domain with respect to the sub-image LL and reducing noise again in a temporal domain with respect to the sub-image LL. For example, the 3DNR device 120 may apply a two-dimensional noise reduction (2DNR) filter to a current sub-image $LL_t$ provided from the DWT device 110 to primarily perform noise reduction (e.g., noise reduction in the spatial domain). Next, the 3DNR device 120 may compare the sub-image, the noise of which is primarily removed, with previous sub-image $LL_{t-1}$ previously stored in the frame memory 130 and may secondarily perform noise cancellation (e.g., noise cancellation in the temporal domain) to generate a sub-image LL'. In other words, the sub-image LL' output from the 3DNR device 120 may be a current sub-image $LL_t'$, the noise of which is removed.

The 3DNR device 120 may store the current sub-image $LL_t'$, which is reduced in noise in the 3DNR method, in the frame memory 130. Furthermore, the 3DNR device 120 may transmit the current sub-image $LL_t'$, which is reduced in noise, to the image adder 140. The current sub-image $LL_t'$ stored in the frame memory 130 may be used as a new previous sub-image for 3DNR of a next sub-image $LL_{t+1}$. When receiving the two-step sub-image LL2 from the DWT device 110, the 3DNR device 120 may perform 3DNR for the two-step sub-image LL2 and may store a two-step sub-image LL2', which is reduced in noise, in the frame memory 130.

The frame memory 130 may store image information necessary when the 3DNR device 120 performs 3DNR for the current sub-image LL. For example, when the 3DNR device 120 performs 3DNR for the current sub-image $LL_t$ provided from the DWT device 110, the frame memory 130 may store a previous sub-image $LL_{t-1}$ to be compared with the current sub-image $LL_t$. At this time, the previous sub-image $LL_{t-1}$ stored in the frame memory 130 may be the sub-image LL' which is reduced in noise by the 3DNR device 120 immediately before.

In the present embodiment, because the 3DNR device 120 performs 3DNR for only the sub-image LL of the low-frequency component among the sub-images LL, LH, HL, and HH and because the sub-image LL is an image, the size (e.g., capacity) of which decreases to ¼ compared to the source image by down sampling, the size of the frame memory 130, which is necessary for 3DNR, may be considerably reduced. When the DWT device 110 divides the source image up to two steps to generate the sub-images LL2, LH2, HL2, and HH2 and when the 3DNR device 120 performs the 3DNR for only the two-step sub-image LL2, the size of the frame memory 130, which is necessary for 3DNR, may be further reduced.

The image adder 140 may add the sub-image LL', which is reduced in noise by the 3DNR device 120, and the sub-images LH, HL, and HH from the DWT device 110 and may output the added sub-images LL', LH, HL, and HH to the IDWT device 150. In other words, the image adder 140 may add the sub-image LL', the 3DNR of which is performed, and the sub-images LH, HL, and HH, the 3DNR of which is not performed, with respect to one source image, and may output the added sub-image LL', LH, HL, and HH to the IDWT device 150.

The IDWT device 150 may synthesize the sub-images LL', LH, HL, and HH added by the image adder 140 to restore the source image. For example, the IDWT device 150 may perform IDWT for the sub-images LL', LH, HL, and HH divided by DWT to synthesize the sub-images LL', LH, HL, and HH, thus restoring the source image. At this time, because the sub-image LL' is an image, which is reduced in noise in the sub-image LL, the restored image (hereinafter referred to as a "restoration image") may be an image, which is reduced in noise in an original source image.

Figure 4:
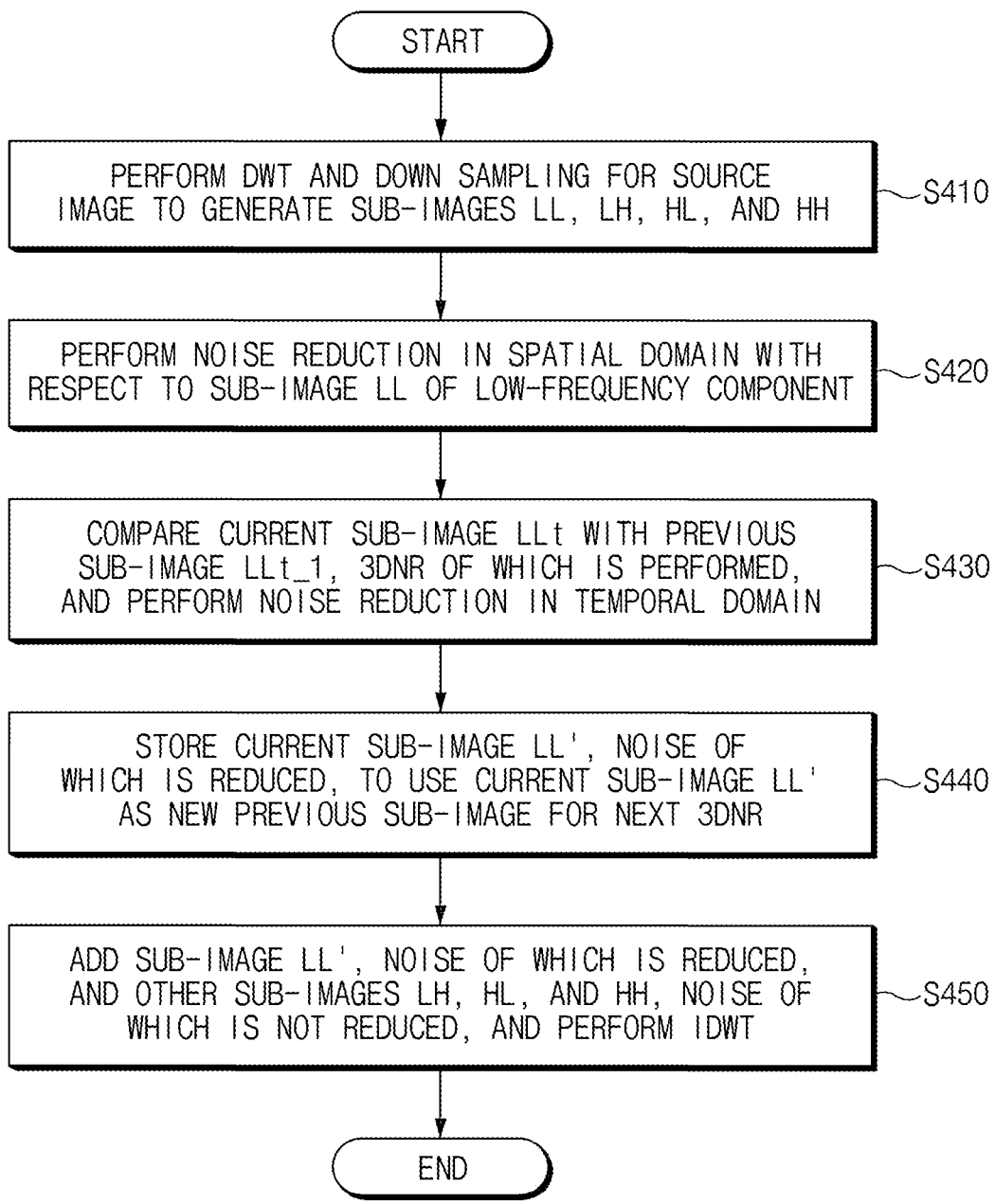
FIG. 4 is a flowchart for describing an image processing method according to an embodiment of the present disclosure.

FIG. 4 is a flowchart for describing an image processing method according to an embodiment of the present disclosure, which is a drawing sequentially illustrating an image processing method performed in an image processing apparatus of FIG. 1.

Referring to FIG. 4, when a source image is input, in S410, a DWT device 110 of FIG. 1 may perform DWT and down sampling for the source image to divide the source image into a plurality of sub-images LL, LH, HL, and HH.

For example, the DWT device 110 may apply a low pass filter X-LPF and a high pass filter X-HPF to the source image in a horizontal direction (e.g., an X direction) to divide the one source image into a sub-image having a low-frequency component in the horizontal direction and a sub-image having a high-frequency component in the horizontal direction. Next, as shown in FIG. 2, the DWT device 110 may perform first down sampling (2↓), which takes only half of input data in the horizontal direction, with respect to each of the sub-images divided into the low-frequency component and the high-frequency component in the horizontal direction, thus obtaining sub-image L and H, sizes in the horizontal direction of which decrease to ½ compared to the source image.

Next, the DWT device 110 may apply a low pass filter Y-LPF and a high pass filter Y-HPF to each of the sub-images L and H in a vertical direction (e.g., a Y direction) to divide each of the sub-images L and H into a low-frequency component and a high-frequency component in the vertical direction and may perform second down sampling (2↓), which takes only half of input data, in the vertical direction for the divided sub-images, thus obtaining four sub-images LL, LH, HL, and HH, each of sizes of which decreases by ½ in the horizontal direction and the vertical direction compared to the source image. In other words, one source image (e.g., one source frame) may be divided into the four sub-images LL, LH, HL, and HH, sizes (e.g., capacities) of which decrease to ¼ by the DWT device 110.

At this time, LL may indicate a sub-image having the low-frequency component in the horizontal direction and the vertical direction, and LH, HL, and HH may indicate sub-images, each of which has the high-frequency component, which have pieces of edge information about horizontal, vertical, and diagonal directions of the source image, respectively.

The DWT device 110 may transmit the sub-image LL having the low-frequency component in the horizontal direction and the vertical direction among the four sub-images LL, LH, HL, and HH to a 3DNR device 120 of FIG. 1 and may transmit the other sub-images LH, HL, and HH, that is, the sub-images LH, HL, and HH having the high-frequency components for the horizontal, vertical, and diagonal directions.

When receiving a signal for the sub-image LL from the DWT device 110, in S420, the 3DNR device 120 may perform noise reduction in a spatial domain with respect to the received sub-image LL.

For example, the 3DNR device 120 may apply a 2DNR filter to the received sub-image LL to reduce noise in the sub-image LL.

In S430, the 3DNR device 120 may perform noise reduction in a temporal domain with respect to the sub-image LL which is primarily reduced in noise in the spatial domain.

For example, the 3DNR device 120 may compare a current sub-image $LL_t$, which is primarily reduced in noise in the spatial domain, with a previous sub-image $LL_{t-1}$ previously stored in a frame memory 130 of FIG. 1 to secondarily perform noise reduction. The previous sub-image $LL_{t-1}$ may indicate that it is stored in the frame memory 130 after 3DNR of the immediately previous sub-image LL is performed (e.g., after noise of the immediately previous sub-image LL is reduced in the spatial domain and the temporal domain).

In S440, the 3DNR device 120 may store the current sub-image $LL_t'$, the 3DNR of which is performed, in the frame memory 130 to use the current sub-image $LL_t'$ as a new previous sub-image for next 3DNR and may transmit the current sub-image $LL_t'$ to an image adder 140 of FIG. 1.

In the present embodiment, as the 3DNR device 120 performs the 3DNR for only the sub-image LL, the sub-image LL may be an image, the size of which decreases to ¼ compared to the source image. In other words, a size of a sub-image (e.g., a previous sub-image) which should be stored in the frame memory 130 for 3DNR may also decrease to ¼ compared to the source image. Thus, compared to performing 3DNR for the source image, the size of the frame memory 130 may decrease to ¼ in the present embodiment.

When the DWT device 110 divides the source image up to two steps to generate sub-images LL2, LH2, HL2, and HH2 and when the 3DNR device 120 performs the 3DNR for only the two-step sub-image LL2, the necessary size of the frame memory 130 may be further reduced.

The image adder 140 may add the sub-image LL', which is reduced in noise by the 3DNR device 120, and the sub-images LH, HL, and HH from the DWT device 110 and may output the added sub-images LL', LH, HL, and HH to an IDWT device 150 of FIG. 1. In S450, the IDWT device 150 may synthesize the sub-images LL', LH, HL, and HH received from the image adder 140 to restore the source image.

For example, the IDWT device 150 may perform IDWT for the sub-images LL', LH, HL, and HH to restore the source image. At this time, because the sub-image LL' is an image, which is reduced in noise in the sub-image LL, a restoration image may be an image which is reduced in noise in an original source image.

Figure 5A:
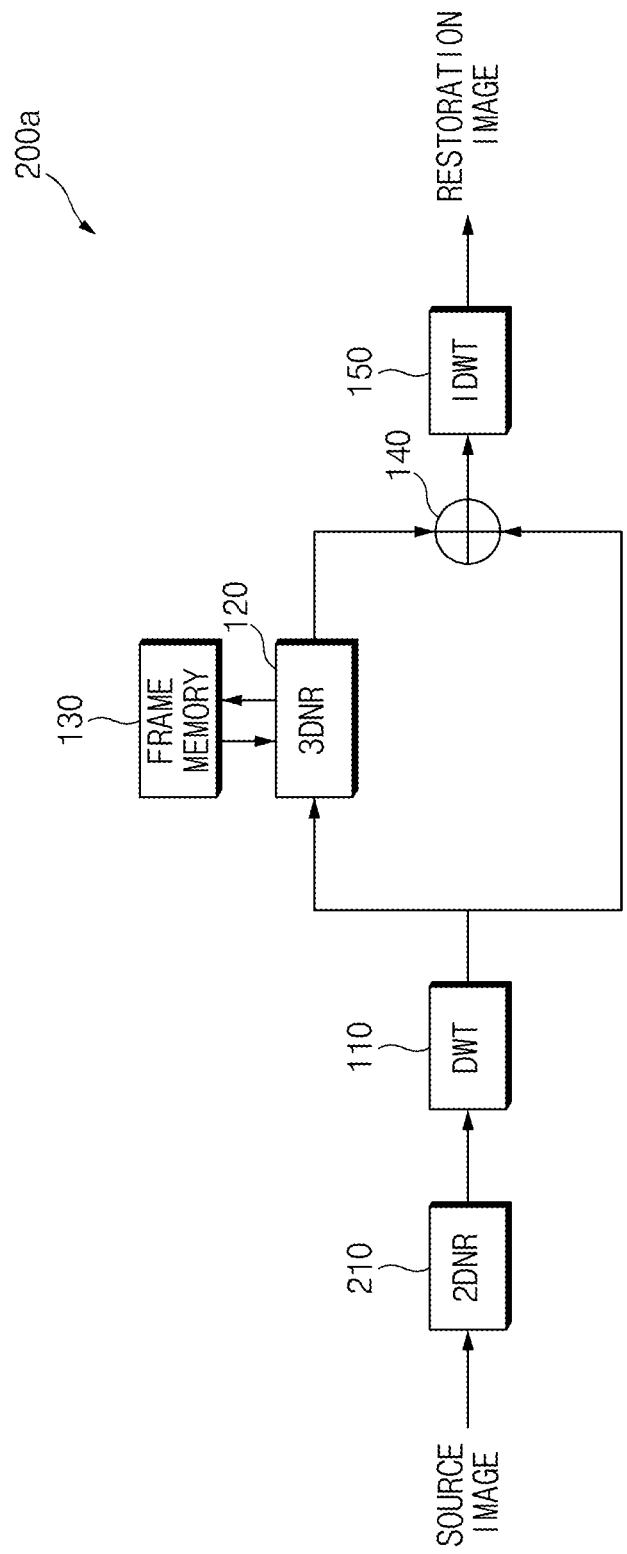
FIGS. 5A and 5B are block diagrams schematically illustrating a configuration of an image processing apparatus according to other embodiments of the present disclosure.
Figure 5B:
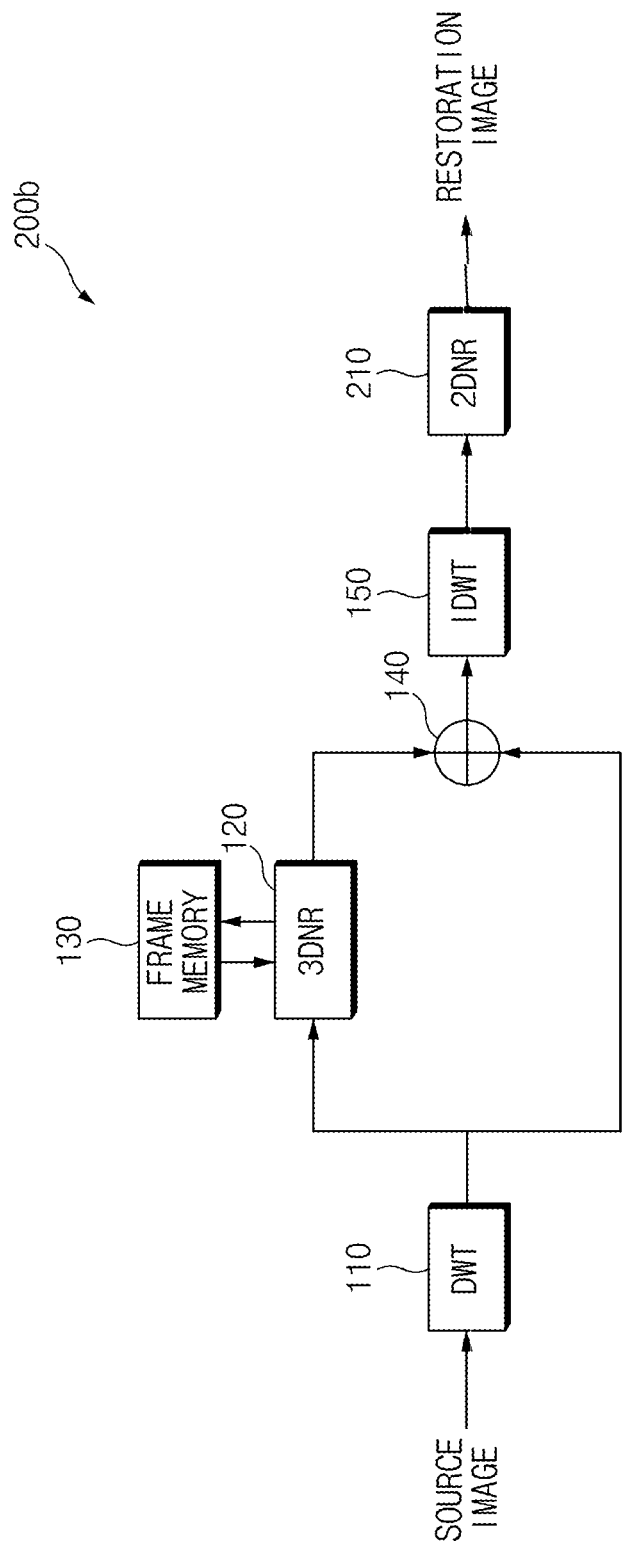

FIGS. 5A and 5B are block diagrams schematically illustrating a configuration of an image processing apparatus according to other embodiments of the present disclosure.

Referring to FIGS. 5A and 5B, compared to the image processing apparatus 100 described above with reference to FIG. 1, an image processing apparatus 200a or 200b may additionally include a 2DNR device 210 which is located at an input terminal of a DWT device 110 or an output terminal of an IDWT device 150. The 2DNR device 210 may perform 2DNR for applying a 2DNR filter to a source image or a restoration image to reduce noise in a spatial domain.

Although the human eye is relatively insensitive to motion information of a high-frequency component unlike motion of a low-frequency component, 2D noise may be amplified in a process of amplifying a signal in an image sensor to cause deterioration in image quality.

Because the image processing apparatus 100 in FIG. 1 performs noise reduction for only the sub-image LL including the low-frequency component, in the present embodiment, the 2DNR device 210 may be formed at the input terminal of the DWT device 110 or the output terminal of the IDWT device 150 to first reduce 2D high-frequency noise in the source image before DWT of the source image is performed or reduce 2D high-frequency noise in an image restored by IDWT. As a result, the image processing apparatus 200a or 200b may reduce high-frequency noise together with low-frequency noise while using a frame memory 130 with a small size.

In FIGS. 5A and 5B, the DWT device 110, the 3DNR device 120, the frame memory 130, the image adder 140, and the IDWT device 150 may perform the same functions as the above-mentioned corresponding components in FIG. 1. Thus, the same reference numerals as those in FIG. 1 are used for the corresponding components in FIGS. 5A and 5B, a description of the corresponding components will be omitted.

Figure 6:
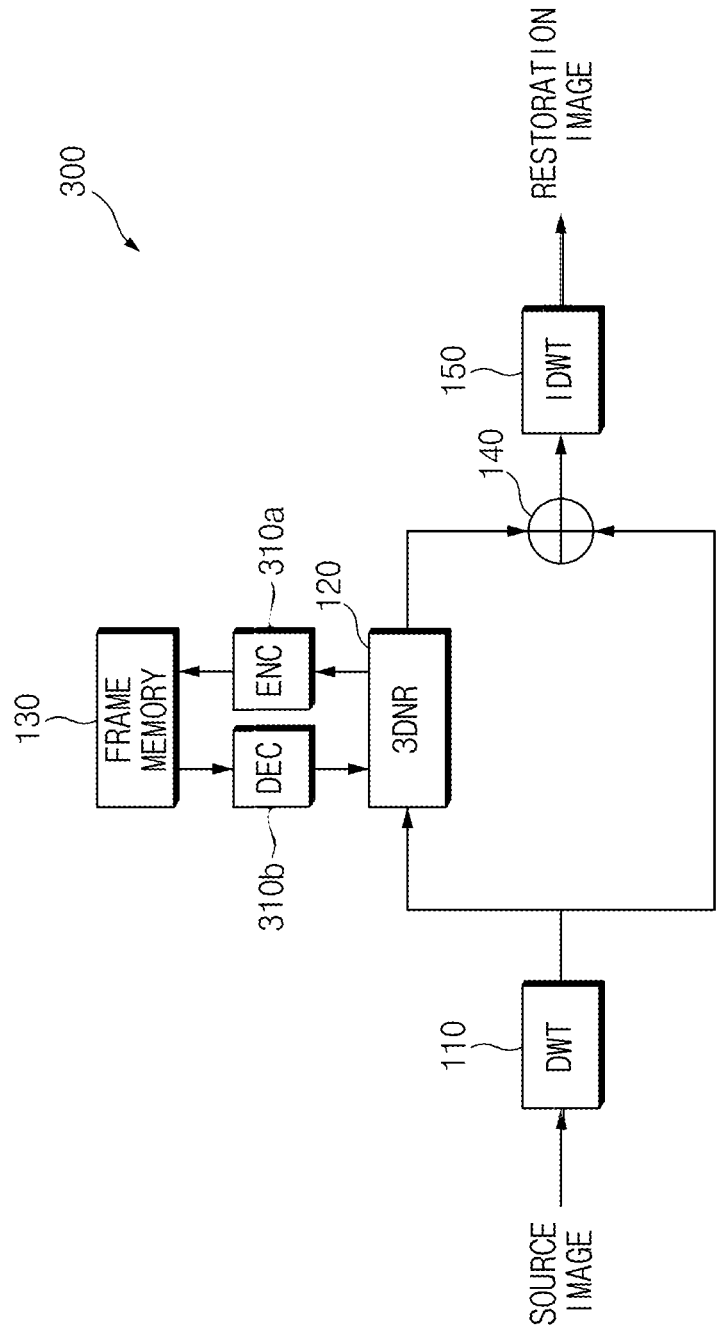
FIG. 6 is a block diagram schematically illustrating a configuration of an image processing apparatus according to other embodiments of the present disclosure.

FIG. 6 is a block diagram schematically illustrating a configuration of an image processing apparatus according to other embodiments of the present disclosure.

Referring to FIG. 6, compared to an image processing apparatus 100 of FIG. 1, an image processing apparatus 300 may further include an encoder 310a and a decoder 310b, which are located between a 3DNR device 120 and a frame memory 130.

The encoder 310a may compress a sub-image from the 3DNR device 120 and may transmit the compressed sub-image to the frame memory 130. In other words, when storing a current sub-image $LL_t'$, 3DNR of which is performed by the 3DNR device 120, in the frame memory 130, the encoder 310a may compress the current sub-image $LL_t'$ to be stored and may transmit the compressed sub-image to the frame memory 130.

The decoder 310b may decompress the compressed sub-image stored in the frame memory 130 and may transmit the decompressed sub-image to the 3DNR device 120. In other words, when the 3DNR device 120 reads the previous sub-image $LL_{t-1}$ stored in the frame memory 130 to perform 3DNR, the decoder 310b may decompress the compressed and stored sub-image $LL_{t-1}$ and may transmit the decompressed sub-image to the 3DNR device 120.

In FIG. 6, the DWT device 110, the 3DNR device 120, the frame memory 130, the image adder 140, and the IDWT device 150 may perform the same functions as the above-mentioned corresponding components in FIG. 1. Thus, the same reference numerals as those in FIG. 1 are used for the corresponding components in FIG. 6, a description of the corresponding components will be omitted.

An embodiment of the present disclosure may remove noise in an image signal even using a frame memory with small capacity to reduce the cost of the image processing apparatus.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An image processing apparatus, comprising:
   a discrete wavelet transform (DWT) device configured to perform DWT and down sampling for a first source image to divide the first source into a low-frequency sub-image including a low-frequency component in a horizontal direction and a vertical direction and a plurality of high-frequency sub-images, each of which includes a high-frequency component in at least one of the horizontal direction or the vertical direction;
   a frame memory storing a low-frequency sub-image of a second source image which is input before the first source image is input and is reduced in noise;
   a first noise reduction device configured to reduce noise in the low-frequency sub-image of the first source image using the low-frequency sub-image of the second source image stored in the frame memory; and
   an inverse discrete wavelet transform (IDWT) device configured to apply IDWT to the low-frequency sub-image of the first sub-image, the low-frequency sub-image being reduced in noise through the first noise reduction device, and the high-frequency sub-images of the first sub-image, the high-frequency sub-images not passing through the first noise reduction device, to restore the first source image.

2. The image processing apparatus of claim 1, wherein the DWT device applies a low pass filter and a high pass filter to the first source image in the horizontal direction and performs down sampling for the first source image in the horizontal direction to generate a first sub-image and a second sub-image and applies a low pass filter and a high pass filter to each of the first sub-image and the second sub-image in the vertical direction and performs down sampling for each of the first sub-image and the second sub-image in the vertical direction to generate the low-frequency sub-image and the high-frequency sub-images for the first source image.

3. The image processing apparatus of claim 1, wherein the first noise reduction device reduces noise in a spatial domain with respect to the low-frequency sub-image of the first source image and reduces noise in a temporal domain by comparing the low-frequency sub-image of the first source image with the low-frequency sub-image of the second source image.

4. The image processing apparatus of claim 1, further comprising:
   a second noise reduction device located at an input terminal of the DWT device and configured to apply a two-dimensional noise reduction (2DNR) filter to the first source image.

5. The image processing apparatus of claim 1, further comprising:
   a third noise reduction device located at an output terminal of the IDWT device and configured to apply a 2DNR filter to the first source image restored by the IDWT device.

6. The image processing apparatus of claim 1, wherein the first noise reduction device stores the low-frequency sub-image of the first source image, the low-frequency sub-image being is reduced in noise, in the frame memory.

7. The image processing apparatus of claim 6, further comprising:

an encoder configured to compress the low-frequency sub-image of the first source image, the low-frequency sub-image being reduced in noise by the first noise reduction device, and store the compressed low-frequency sub-image in the frame memory; and a decoder configured to decompress the low-frequency sub-image of the second source image, the low-frequency sub-image being compressed and stored in the frame memory, and transmit the decompressed low-frequency sub-image to the first noise reduction device.

8. An image processing method, comprising:

performing DWT and down sampling for a first source image to divide the first source into a low-frequency sub-image including a low-frequency component in a horizontal direction and a vertical direction and a plurality of high-frequency sub-images including a high-frequency component in at least one of the horizontal direction or the vertical direction;

reducing noise in the low-frequency sub-image of the first source image using a low-frequency sub-image of a second source image stored in a memory; and performing IDWT of the low-frequency sub-image of the first sub-image, the low-frequency sub-image being reduced in noise through the performing of the DWT and the down sampling and the reducing of the noise, and the high-frequency sub-images of the first image, the high-frequency sub-images not passing through the performing of the DWT and the down sampling and the reducing of the noise to restore the first source image.

9. The image processing method of claim 8, wherein the dividing of the first source image includes:

applying a low pass filter and a high pass filter to the first source image in the horizontal direction and performing down sampling for the first source image in the horizontal direction to generate a first sub-image and a second sub-image; and applying a low pass filter and a high pass filter to each of the first sub-image and the second sub-image in the vertical direction and performing down sampling for each of the first sub-image and the second sub-image in the vertical direction to generate the low-frequency sub-image and the high-frequency sub-images for the first source image.

10. The image processing method of claim 8, wherein the low-frequency sub-image of the second source image is a low-frequency sub-image which is separated from the second source image being input before the first source image is input and is reduced in noise.

11. The image processing method of claim 8, further comprising:

applying a 2DNR filter to the first source image, before dividing the first source image.

12. The image processing method of claim 8, further comprising:

applying a 2DNR filter to the restored first source image, after restoring the first source image.

13. The image processing method of claim 8, wherein the reducing of the noise includes:

storing the low-frequency sub-image of the first source image, the low-frequency sub-image being reduced in noise, in the memory.

14. The image processing method of claim 10, wherein the reducing of the noise includes:

reducing noise in a spatial domain with respect to the low-frequency sub-image of the first source image, comparing the low-frequency sub-image of the first source image with the low-frequency sub-image of the second source image, and reducing noise in a temporal domain.

15. The image processing method of claim 13, wherein the reducing of the noise includes:

compressing and storing the low-frequency sub-image of the first source image, when storing the low-frequency sub-image of the first source image in the memory.

* * * * *